United States Patent
Pan (10) Patent No.: US 8,407,266 B1
(45) Date of Patent: Mar. 26, 2013

(54) METHOD AND SYSTEM FOR AUTOMATICALLY SAVING A DOCUMENT TO MULTIPLE FILE FORMATS

(75) Inventor: Eric Young Pan, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 223 days.

(21) Appl. No.: 12/830,186

(22) Filed: Jul. 2, 2010

(51) Int. Cl.
*G06F 17/30* (2006.01)

(52) U.S. Cl. ........................................ 707/827; 715/248

(58) Field of Classification Search .................. 707/500, 707/654, 4, 749, 802, 803, 201, 770; 715/248
See application file for complete search history.

(56) References Cited

U.S. PATENT DOCUMENTS

| | | | |
|---|---|---|---|
| 6,347,323 B1 * | 2/2002 | Garber et al. .......................... | 1/1 |
| 6,529,910 B1 * | 3/2003 | Fleskes .......................... | 707/770 |
| 6,643,652 B2 * | 11/2003 | Helgeson et al. ..................... | 1/1 |
| 7,188,311 B2 * | 3/2007 | Tanaka et al. ................. | 715/248 |
| 7,200,668 B2 * | 4/2007 | Mak et al. ..................... | 709/230 |
| 7,526,494 B2 * | 4/2009 | Rom et al. ............................ | 1/1 |
| 7,844,898 B2 * | 11/2010 | Ross et al. .................... | 715/249 |
| 2003/0018661 A1 * | 1/2003 | Darugar ......................... | 707/500 |
| 2003/0130999 A1 * | 7/2003 | Probert et al. ..................... | 707/3 |
| 2004/0230567 A1 * | 11/2004 | Wookey ............................. | 707/3 |
| 2004/0249839 A1 * | 12/2004 | Beenau et al. ................. | 707/100 |
| 2007/0168400 A1 * | 7/2007 | Lee et al. ....................... | 707/201 |
| 2008/0222121 A1 * | 9/2008 | Wiessler et al. .................. | 707/4 |
| 2009/0099982 A1 * | 4/2009 | Heuler et al. ................... | 706/11 |
| 2011/0047166 A1 * | 2/2011 | Stading et al. ................ | 707/749 |
| 2011/0238628 A1 * | 9/2011 | Osborne et al. ............... | 707/654 |

* cited by examiner

*Primary Examiner* — James Trujillo
*Assistant Examiner* — Thong Vu
(74) *Attorney, Agent, or Firm* — Osha Liang LLP (57) ABSTRACT

A method and system for automatically saving a document in multiple file formats. A first file for the document is modified and saved on a persistent storage device using a primary file format. A second file for the document is saved on the persistent storage device using a secondary file format. The method further involves re-saving the first file as modified using the primary file format. When the first file is saved using the primary file format, the method further involves deleting the second file from the persistent storage device. A first mapping associating the second file with the first file is deleted. A third file for the document is created using the secondary file format and saved to the persistent storage device using the secondary file format. A second mapping associating the third file with the first file is created.

27 Claims, 9 Drawing Sheets

METHOD AND SYSTEM FOR AUTOMATICALLY SAVING A DOCUMENT TO MULTIPLE FILE FORMATS

BACKGROUND

A modern computer system may be conceptually divided into hardware, operating system, and application programs. Hardware (i.e., central processing unit (CPU) or processor, memory, persistent storage devices, and input/output (I/O) devices) provides the basic computing resources. An example of a hardware function is storage. For example, a persistent storage device may be used to maintain data for retrieval by the operating system or an application program. An operating system is a program that acts as an intermediary between the application program layer and the computer hardware. To this end, the operating system is involved in coordinating the use of the hardware resources to enable a broad range of computative tasks (i.e., memory management, hardware resource management, maintaining a file system, processing user-level requests, administrative tasks, networking tasks, etc.). An application program (i.e., compilers, database systems, software, and business programs) defines how these hardware resources are used to solve the computing problems of the users. The users may include people, machines, and other computers that use the application programs, which in turn employ hardware resources to solve numerous types of problems. In doing so, an application program may store, retrieve, or modify data which is stored in a computer system's persistent storage.

SUMMARY

In general, embodiments of the invention may be directed to a method for automatically saving a document in multiple file formats. The method involves modifying, using an application executing on a hardware processor, a first file for the document. The first file is saved on a persistent storage device using a primary file format. A second file for the document is saved on the persistent storage device using a secondary file format. The method further involves re-saving, using the application, the first file as modified using the primary file format. When the first file is saved using the primary file format, the method further involves the following steps. The second file is deleted, using the application, from the persistent storage device. A first mapping associating the second file with the first file is deleted using the application. A third file for the document is created, by the application, using the secondary file format. The third file is saved, by the application, to the persistent storage device using the secondary file format. A second mapping associating the third file with the first file is created using the application.

In general, embodiments of the invention may be directed to a system comprising at least one hardware processor, a persistent storage device, a display device interacting with the hardware processor, and a memory coupled to the hardware processor and display device. The memory includes executable instructions to modify, using an application executing on the hardware processor, a first file for a document. The first file is saved on the persistent storage device using a primary file format. A second file for the document is saved on the persistent storage device using a secondary file format. The memory includes further executable instructions to re-save, using the application, the first file as modified using the primary file format. The memory includes further the following executable instructions for when the first file is saved using the primary file format: delete, using the application, the second file from the persistent storage device; delete, using the application, a first mapping associating the second file with the first file; create, using the application, a third file for the document using the secondary file format; save, using the application, the document as the third file on the persistent storage device using the secondary file format; and create, using the application, a second mapping associating the third file with the first file.

In general, embodiments of the invention may be directed to a computer readable storage medium comprising instructions for automatically saving a document in multiple file formats. The instructions include functionality for: modifying a first file for the document, when the first file is saved using a primary file format and when a second file for the document is saved using a secondary file format. The instructions further include functionality for resaving the first file as modified using the primary file format. When the first file is saved using the primary file format, the instructions further include functionality for: deleting the second file from the persistent storage device; deleting a first mapping associating the second file with the first file; creating a third file for the document using the secondary file format; saving the document as the third file on the persistent storage device using the secondary file format; and creating a second mapping associating the third file with the first file.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system, method, and computer readable storage medium for automatically saving a document to multiple file formats. In one or more embodiments of the invention, a document may be created and/or modified before being saved to storage as a first file. In one or more embodiments of the invention, the file format used for saving a first file for a document is a primary file format. In one or more embodiments of the invention, a primary file format may be a file format selected by a creator of the document at the time the document is saved to storage as the first file.

Alternatively, the first file format may be pre-defined as a proprietary file format exclusively associated with the application used to create the document. As such, the first file saved using a proprietary file format may be accessible only to the application with which the proprietary file format is associated. For example, a Photoshop Document (.PSD) file format is a well-known proprietary file format associated with Adobe® Photoshop®. (Adobe and Photoshop are trademarks of Adobe Systems, Inc. of San Jose, Calif.).

In accordance with one or more embodiments of the invention, the document is additionally saved to storage as a second file using a second file format. As such, the document is saved as a first file using a primary file format and as a second file using a different file format. In one or more embodiments of the invention, any file format other than the primary file format is a secondary file format. In one or more embodiments of the invention, the secondary file format is a non-proprietary file format not exclusively associated with the application used to create a first file for the document. As such, a file saved using a secondary file format may be accessible by more than one application.

For example, if a creator of a document first saves the document to storage as a first file using the .PSD file format, then the .PSD file format is the primary file format for the document. Portable Network Graphics (.PNG), Graphics Interchange Format (.GIF), and JPEG (.JPG) are then all considered secondary file formats that function as alternatives to the .PSD file format and/or each other. As such, if the creator of the document selects the .PNG file format for saving a second file for the document (e.g., already saved as a first file using the .PSD file format), then the .PNG is a secondary file format for the document.

In one or more embodiments of the invention, a mapping may be created to associate a second file for a document saved using a secondary file format with a first file for a document saved using a primary file format. As such, when a creator of the document modifies the document using an application, the first file may be manually re-saved by the creator in storage using the primary file format. However, merely re-saving the first file creates an inconsistency in that the modifications introduced to the document are not yet represented in the second file for the document. Accordingly, embodiments of the invention provide a mechanism for maintaining a consistency between a file saved for a document using a primary file format and any other files saved to storage for the same document using secondary file formats.

Figure 1A:
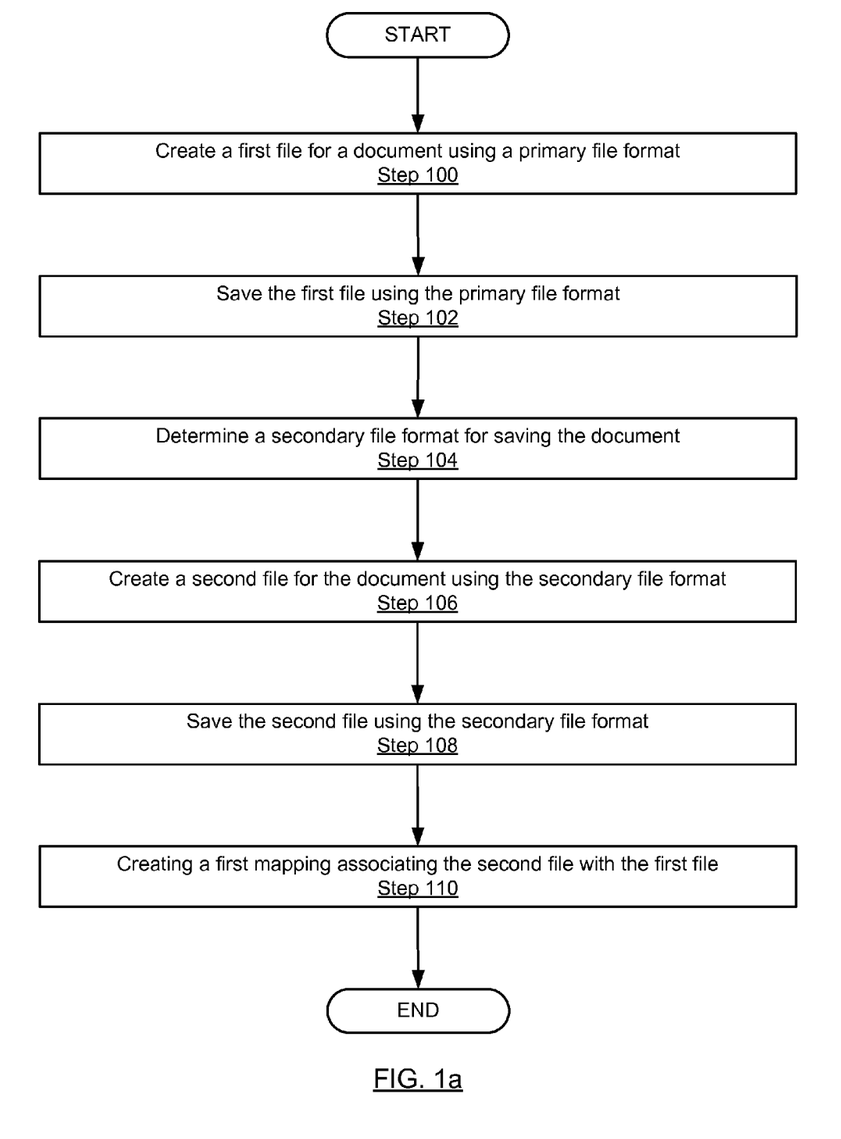
FIGS. 1a and 1b show a flowchart in accordance with one or more embodiments of the invention.
Figure 1B:
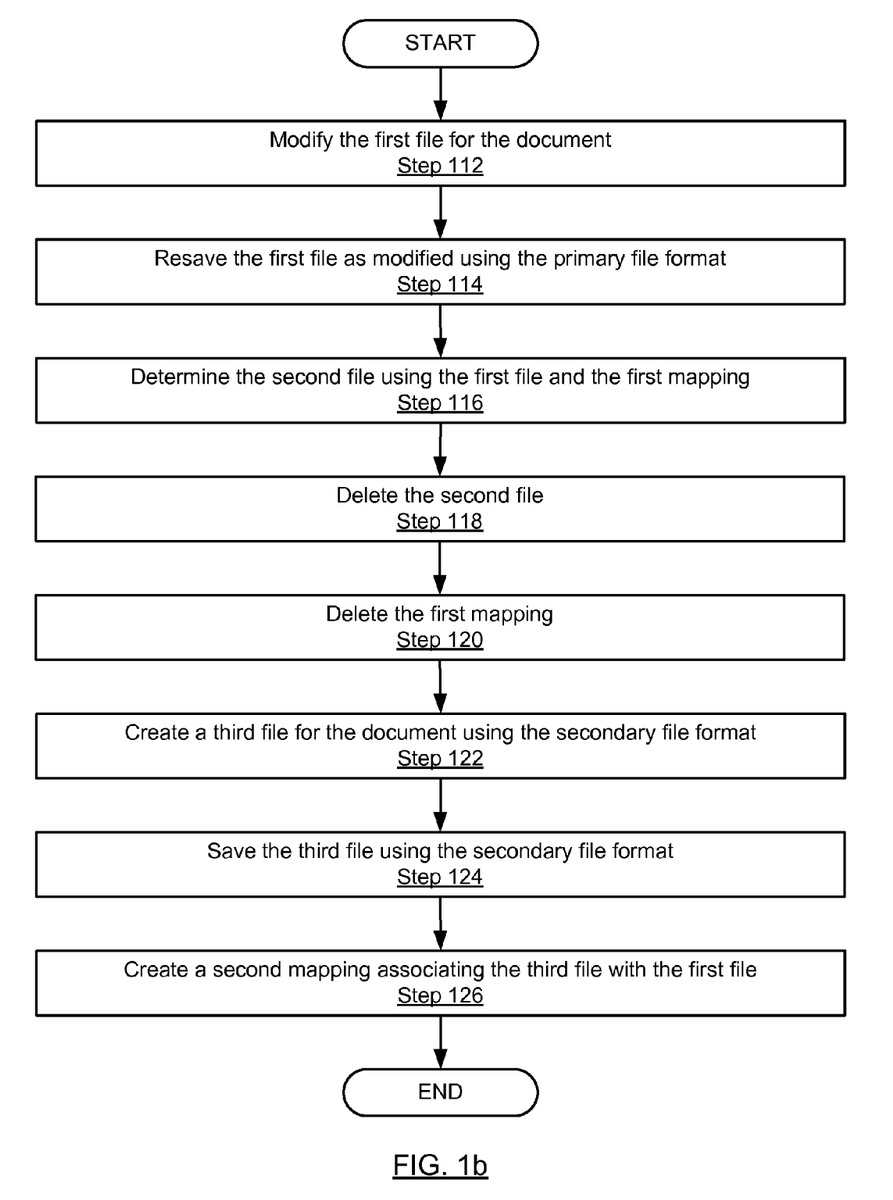

FIGS. 1a and 1b show a flowchart in accordance with one or more embodiments of the invention. While the various steps in these flowcharts are presented and described sequentially, one should appreciate that some or all of the steps may be executed in different orders, may be combined or omitted, and some or all of the steps may be executed in parallel. In addition, steps have been omitted to simplify the presentation. The process shown in FIG. 1a may be used to, for example, save files for a document in primary and secondary file formats.

In Step 100, a first file may be created for a document using a primary file format. In one or more embodiments of the invention, the first file may be created by a user using an application. Further, in accordance with one or more embodiments of the invention, the primary file format may be a proprietary file format associated exclusively with the application. In Step 102, the first file for the document is saved to storage using the primary file format.

In Step 104, a secondary file format is determined for saving the document to storage as a second file. In one or more embodiments of the invention, the secondary file format may be determined based on an input provided by a user. For example, an application may prompt a user to provide an input indicating a secondary file format for use in saving a second file for the document.

In Step 106, a second file is created for the document using the secondary file format. In one or more embodiments of the invention, the second file may be created automatically as a response to an input provided by a user in relation to Step 104.

In Step 108, the second file for the document is saved to storage using the secondary file format. In Step 110, a first mapping is created associating the second file with the first file. In one or more embodiments of the invention, the first mapping may be created and maintained using a data structure as discussed in relation to FIG. 1c. In one or more embodiments of the invention, a file path and/or timestamp for each file is maintained by the data structures used to create the first mapping.

In one or more embodiments of the invention, Steps 104-110 are performed automatically in response to the performance of Step 102 (i.e., saving a first file to storage using a primary file format). Said another way, Steps 104-110 are only performed when Step 102 has been performed.

In one or more embodiments of the invention, a user may provide an input in response to a prompt in Step 104 such that a secondary file format is not selected. For example, the user may decide against saving the document to a second file using a secondary file format. Accordingly, when the user decides against saving the document to a second file, Steps 106-110 will not be performed and process of FIG. 1a is complete.

The process shown in FIG. 1b may be used, for example, to save modifications for a document as files in primary and secondary file formats. In Step 112, a first file for a document (i.e., the first file saved using a primary file format as described in Step 100) is modified. In one or more embodiments of the invention, a modification to the document may be made by a user using an application (e.g., application used to create the document and the first file). In Step 114, the first file as modified is re-saved to storage using the primary file format.

In Step 116, the second file is determined using the first file and the first mapping (i.e., the mapping created in Step 110 which associates the second file with the first file). In one or more embodiments of the invention, the mapping is used to determine a file path for the second file. In Step 118, the second file is deleted. In Step 120, the first mapping is deleted. In one or more embodiments of the invention, the second file and the first mapping are deleted using the application.

In Step 122, a third file is created for the document using the secondary file format (i.e., same file format used to save the second file). In Step 124, the third file for the document is saved to storage using the secondary file format.

In Step 126, a second mapping is created associating the third file with the first file. In one or more embodiments of the invention, the second mapping may be created and maintained using a data structure as discussed in relation to FIG. 1c. In one or more embodiments of the invention, a file path and/or timestamp for each file is maintained by the data structures used to create the second mapping.

Figure 1C:
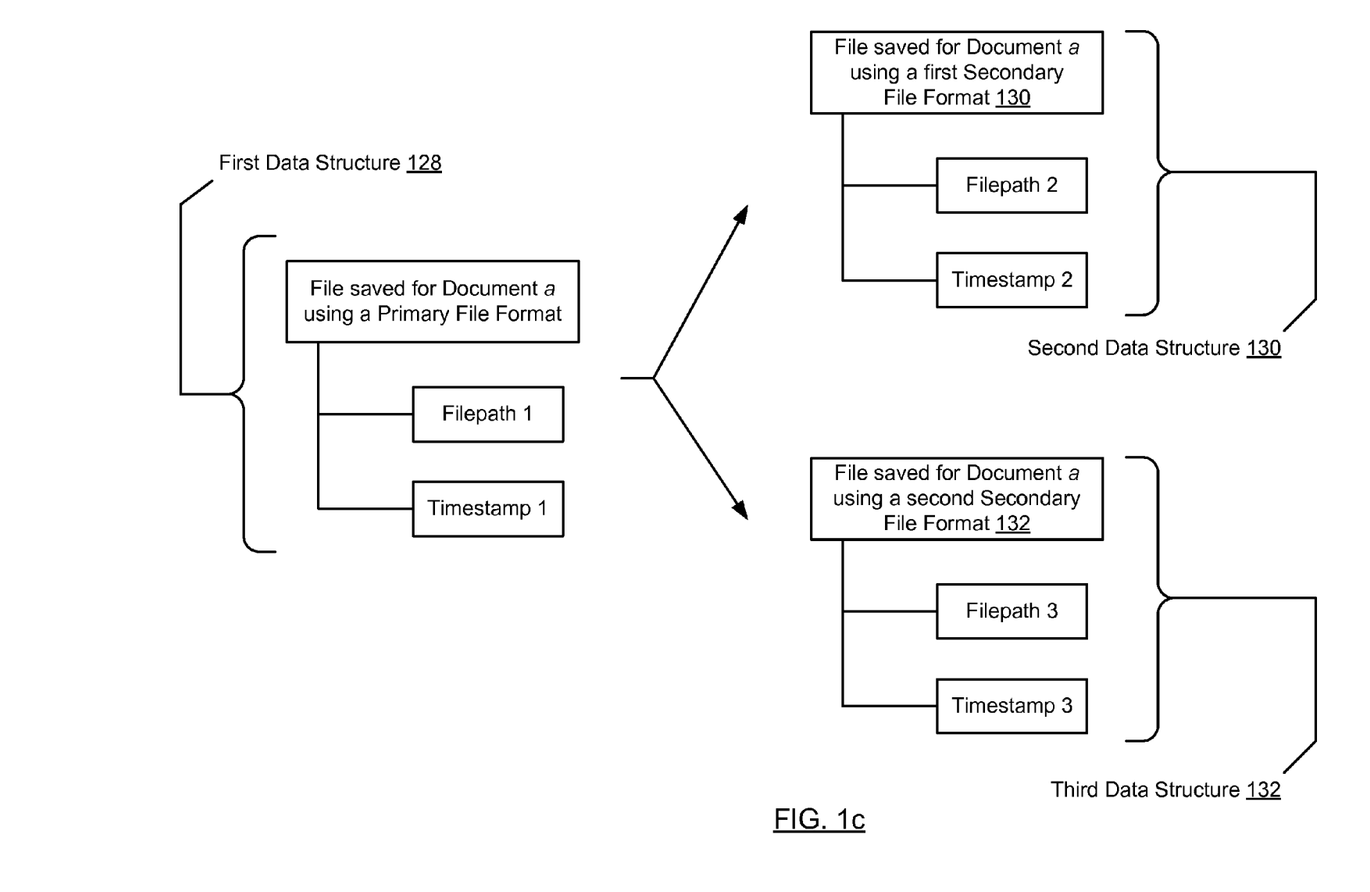
FIG. 1c shows a data structure maintained in accordance with one or more embodiments of the invention.

FIG. 1c shows a data structure maintained in accordance with one or more embodiments of the invention. Specifically, FIG. 1c identifies three particular data structures: (i) a first data structure (128) for a file saved for a document using a primary file format; (ii) a second data structure (130) for a file for the same document saved using a first secondary file format; and (iii) a third data structure (132) for a file for the same document saved using a second secondary file format. In addition, each of the three depicted data structures is shown to have: (a) an associated file path for a storage location where a file is saved; and (b) an associated timestamp for when a file was last saved.

One or more embodiments of the invention may associate a data structure for a second file with a data structure for a first file to associate the second file with the first file. For example, FIG. 1c shows a directional arrow extending from the first data structure (128) to both the second and third data structures (130, 132). The directional arrow in FIG. 1c indicates that the files corresponding with the second and third data structures (130, 132) are associated with the file corresponding with the first data structure (128) in accordance with one or more embodiments of the invention. While the data structures of FIG. 1c show an association between a file saved for a document using a primary file format and two files saved for the document using a first and a second secondary file format, those skilled in the art will appreciate that any number of files (i.e., one or more) saved for a document using secondary file formats may be associated with a file saved for the document using the primary file format.

FIGS. 2a-2f show a system in accordance with one or more embodiments of the invention. The FIGs. depict a user (200) and a computer (208), where the computer includes, in part: (i) an application (202); (ii) an operating system (204); and (iii) storage (206). The system shown in FIGS. 2a-2f may be used, for example, by a user (200) interested in (a) creating a document and (b) maintaining the document and any modifications made to it using numerous file formats.

Figure 2A:
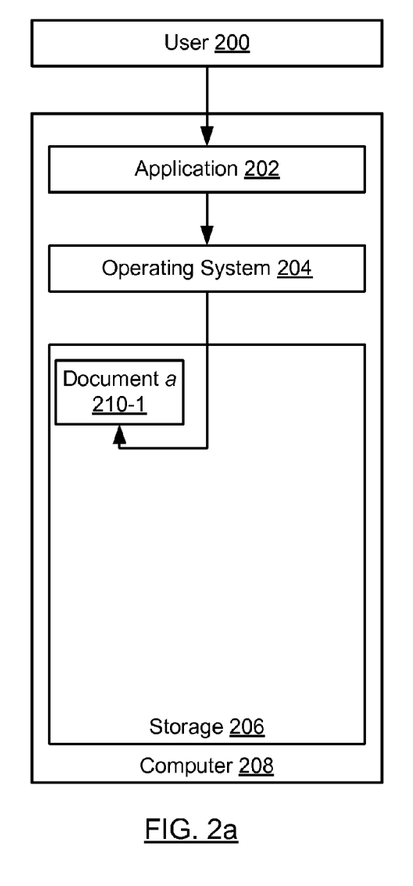
FIGS. 2a-2f show a system in accordance with one or more embodiments of the invention.

In FIG. 2a, the user (200) uses the application (202) to create and save a first file (210-1) for a document to storage (206) using a primary file format. In one or more embodiments of the invention, the primary file format is one selected by the user in creating and saving the first file (210-1) for the document. In one or more embodiments of the invention, the application (202) may utilize the file system features of the operating system (204) to create and save a file for a document.

Figure 2B:
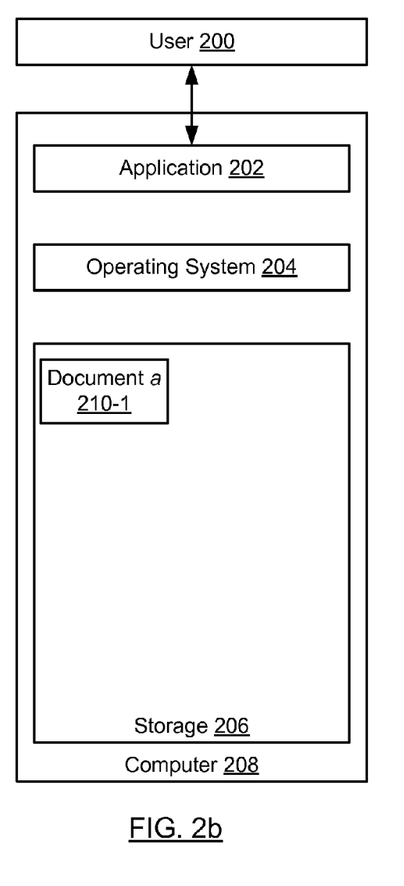

In FIG. 2b, based on the saving of the first file for the document using the primary file format, a prompt is displayed to the user (200) by the application (202). In one or more embodiments of the invention, the prompt is used to determine a secondary file format for saving a second file for the document to storage (206). In accordance with embodiments of the invention, the user (200) provides an input indicating a secondary file format in response to the prompt.

Figure 2C:
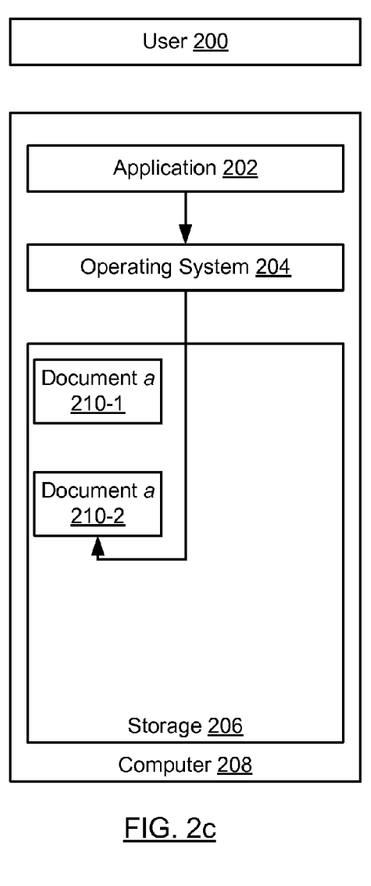

In FIG. 2c, the application (202) creates and saves a second file (210-2) for the document to storage (206) using the determined secondary file format. Accordingly, a first mapping (not shown) is created associating the second file (210-2) for the document with the first file (210-1) for the document. In one or more embodiments of the invention, the first mapping is created by associating a data structure for the second file with a data structure for the first file as described in relation to FIG. 1c. At this time, the user has created a document and saved it to a first file using a primary file format. In addition, the user has created a second file for the document using a secondary file format. As such, the information contained in the document is preserved in two different file formats.

Figure 2D:
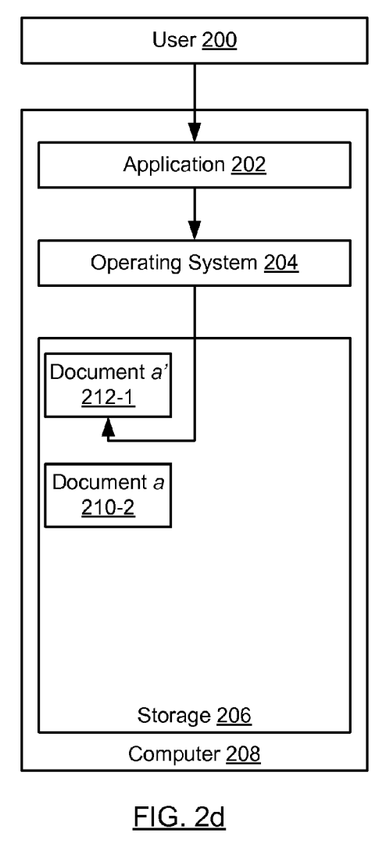

In FIG. 2d, the user (200) uses the application (202) to modify the first file for the document. For example, the user may use the application (202) to open the first file (210-1) for the document and modify the information contained in the document. Having made changes to the information contained in the document, the user (200) may decide to re-save the first file (210-1) for the document to storage (206) for purposes of preserving modifications to the document. To reflect that the document is now a different (i.e., modified) document, FIG. 2d shows a new file (212-1) in storage (206) which replaces the first file depicted earlier (210-1).

Figure 2E:
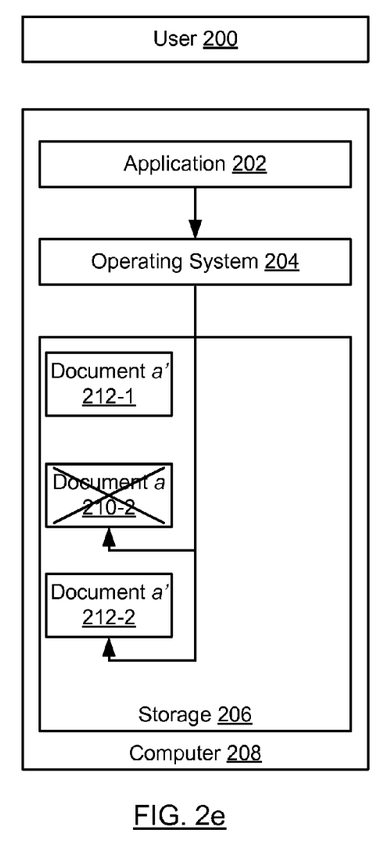

At this time, the information contained in the new file (212-1) accounts for modifications made to the document. However, the information contained in the second file (210-2) for the document does not account for the modifications made to the document. Accordingly, based on the modification of the first file (212-1) for the document, FIG. 2e shows that the application (202): (a) deletes the second file (210-2) for the document from storage (206); (b) deletes the first mapping associating the second file (210-2) with the first file; (c) creates and saves a third file (212-2) for the modified document to storage (206) using the secondary file format; and (d) creates a second mapping (not shown) associating the third file (212-2) with the first file (212-1).

Figure 2F:
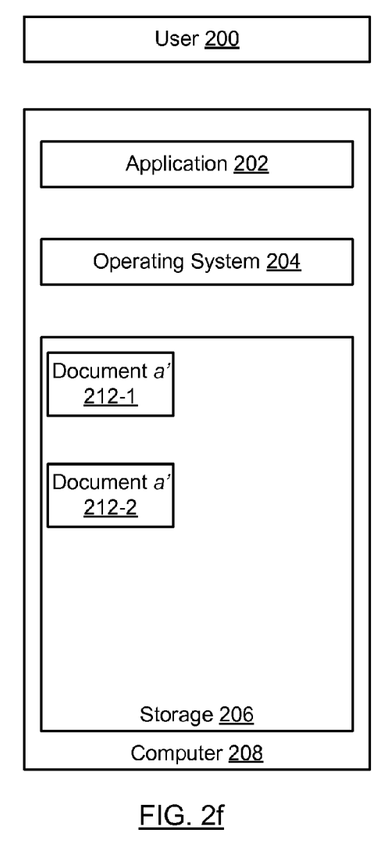

As such, FIG. 2f shows that modifications made to the document are preserved in storage (206) as files (212-1, 212-2) saved using both primary and secondary file formats. Pursuant to FIGS. 2a-2f, embodiments of the invention may condition the availability of secondary file formats to a user (200) when the user pays a fee or retains a subscription. As such, a user (200) who does not pay the fee or does not retain the subscription will only have the ability to save a document to a file using a primary file format.

In one or more embodiments of the invention, files saved using the primary file format and files saved using secondary file formats may be saved in a common directory or may be saved in different directories. For example, with respect to FIG. 2c, embodiments of the invention allow for a user to specify saving the second file (210-2) to the same directory as the first file (210-1). Alternatively, embodiments of the invention allow for a user to specify a different directory (i.e., not the same directory to which the first file (210-1) is saved) for saving the second file (210-2) to.

In one or more embodiments of the invention, a second directory location (e.g., used for saving files in a secondary file format) may be associated with the same storage device (206) as the first directory location (e.g., used for saving files in a primary file format). Alternatively, different storage devices may be used to store files on the basis of whether a file is saved using a primary or a secondary file format. For example, a first storage device may be used for saving a file using a primary file format. The first storage device may be an unshared storage disk local to the machine used by the creator of the document. A second storage device may be used for saving a file using a secondary file format. The second storage disk may be, for example, a network-shared storage disk local to the machine used by the creator of the document or a cloud-based storage system. In such embodiments of the invention, the use a second storage disk with network sharing functionality allows users other than the creator of the document to access a file saved using a secondary file format.

FIGS. 3a-3f show a system in accordance with one or more embodiments of the invention. The FIGs. depict a first user (300) with a first computer (304) and a second user (302) with a second computer (306). The first computer (304) of the first user (300) includes a first application (202) and an operating system (204). The second computer (306) of the second user (302) includes a second application (203) and the operating system (204). The computers (304, 306) are connected over a network (308) to storage (310). The system shown in FIGS. 3a-3f may be used, for example, by a first user (300) interested in (a) creating a document and (b) maintaining the document in numerous file formats such that a second user (302) may access the document in one of a number of available secondary file formats.

Figure 3A:
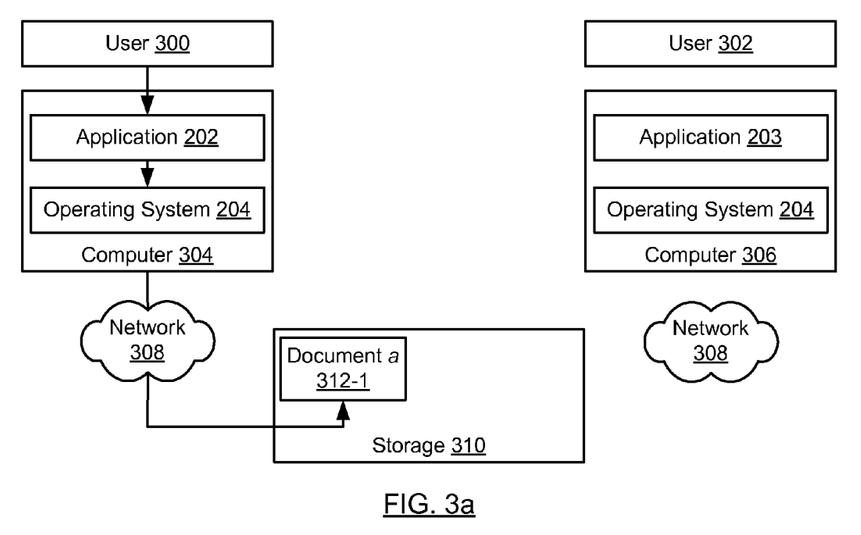
FIGS. 3a-3f show a system in accordance with one or more embodiments of the invention.

In FIG. 3a, the first user (300) uses the first application (202) to create and save a first file (312-1) for a document to storage (310) using a primary file format. In one or more embodiments of the invention, the primary file format is one selected by the first user (300) in creating and saving the first file (312-1) for the document. In one or more embodiments of the invention, the first application (202) may utilize the file system features of an operating system (not shown) for the storage (310) to create and save a file for a document.

Figure 3B:
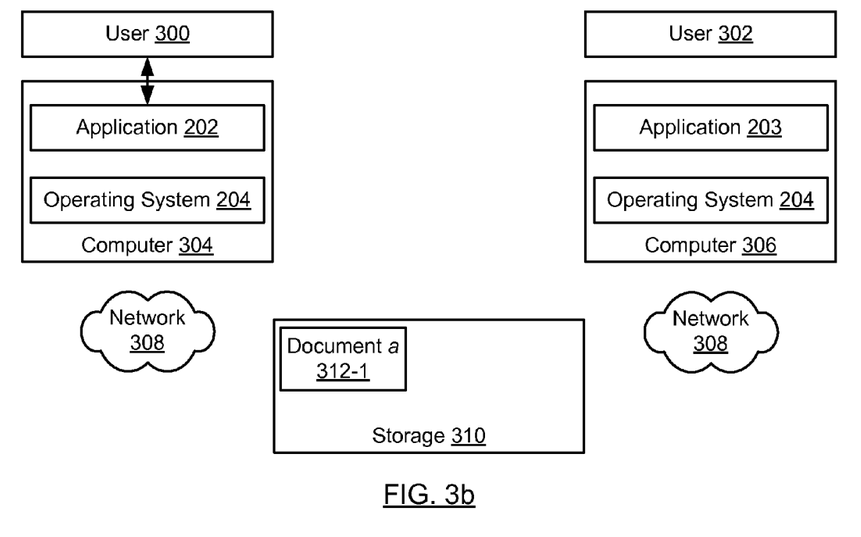

In FIG. 3b, based on the saving of the first file for the document using the primary file format, a prompt is displayed to the first user (300) by the first application (202). In one or more embodiments of the invention, the prompt is used to determine a secondary file format for saving a second file for the document to storage (310). For example, in one or more embodiments of the invention, the first user (300) may determine a secondary file format that is preferred (e.g., non-proprietary, more light-weight, accessible by a different application, etc.) by the second user (302). In accordance with embodiments of the invention, the first user (300) provides an input in response to the prompt indicating a secondary file format.

Figure 3C:
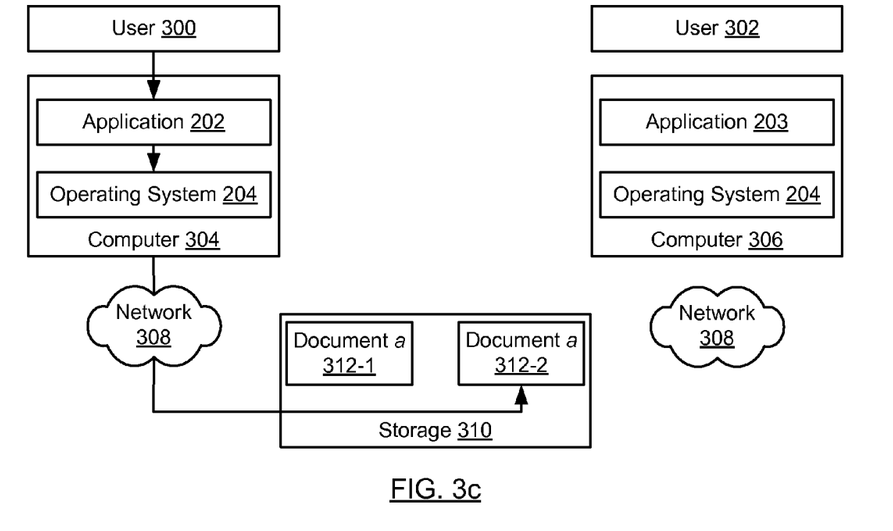

In FIG. 3c, the first application (202) creates and saves a second file (312-2) for the document to storage (310) using the determined secondary file format. Accordingly, a first mapping (not shown) is created associating the second file (312-2) for the document with the first file (312-1) for the document. In one or more embodiments of the invention, the first mapping is created by associating a data structure for the second file with a data structure for the first file as described in relation to FIG. 1c.

At this time, the information contained in the document is saved to storage (310) as two files (312-1, 312-2) using a primary file format and a secondary file format respectively. There may be situations where the second user (302) is unable to access the first file (312-1). For example, the primary file format used in saving the first file (312-1) may be a proprietary file format that is exclusive to the first application (202). As such, because the second user (302) is a user of a different application (203), the second user (302) may be "locked out" of accessing the first file (312-1) as a non-proprietary user. In another example, the proprietary file format may be a richer and more heavy-weight standard that requires more computing resources to access and process. As such, the second user (302) may prefer accessing the document using a secondary file format that is more light-weight and resource-intensive.

Figure 3D:
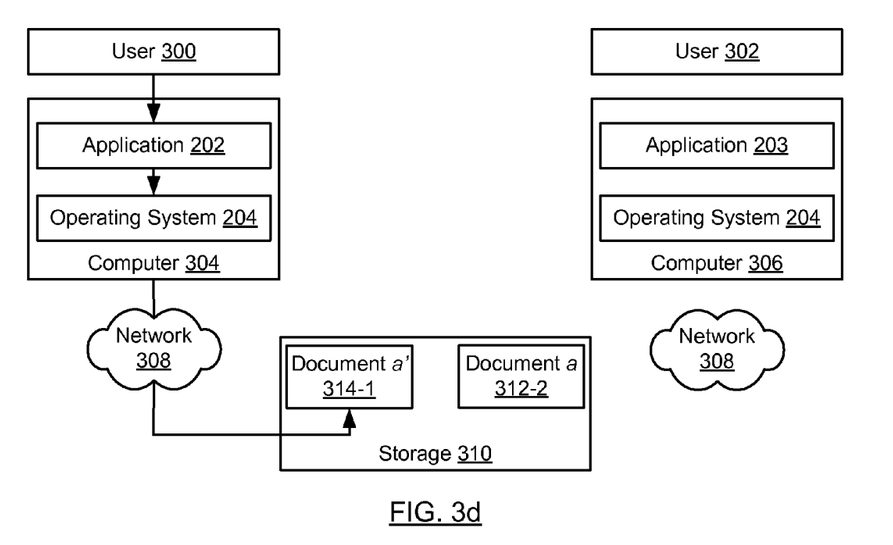

At some later time, the first user (300) may decide to modify the document. For example, as shown in FIG. 3d, the first user (300) may use the first application (202) to open the first file (312-1) for the document for purposes of modifying the document. Having modified the document, the first user (300) may decide to re-save the first file (312-1) for the document to storage (310) to preserve the modified document. To reflect that the document is now a different, modified document, FIG. 3d shows a new first file (314-1) in storage (310) to replace the first file created earlier (312-1).

Figure 3E:
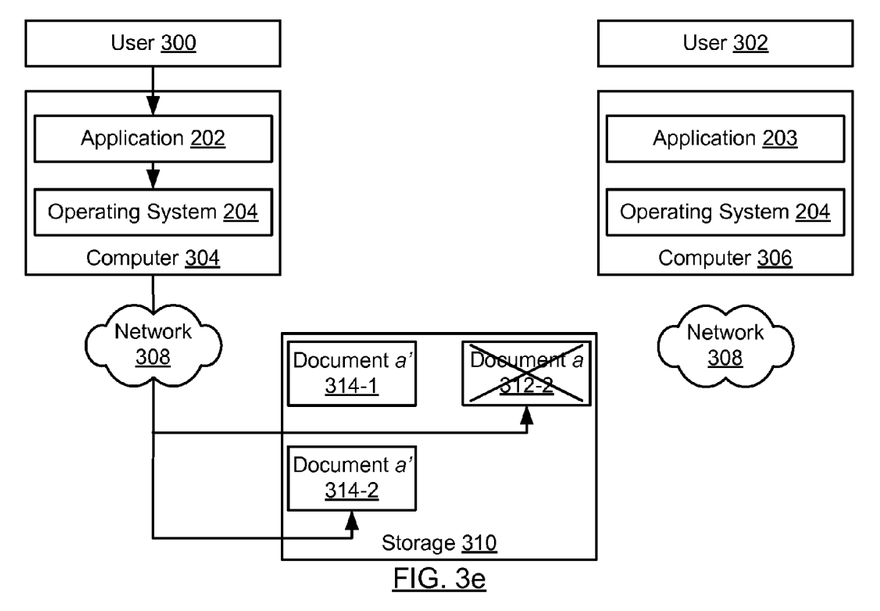

At this time, the information contained in the new first file (314-1) accounts for modifications made to the document. However, the information contained in the second file (312-2) for the document does not account for these same modifications. Accordingly, based on the modification of the first file (314-1) for the document, FIG. 3e shows that the first application (202): (a) deletes the second file (312-2) for the document from storage (310); (b) deletes the first mapping associating the second file (312-2) with the first file; (c) creates and saves a third file (314-2) for the modified document to storage (310) using the secondary file format; and (d) creates a second mapping (not shown) associating the third file (314-2) with the first file (314-1).

Figure 3F:
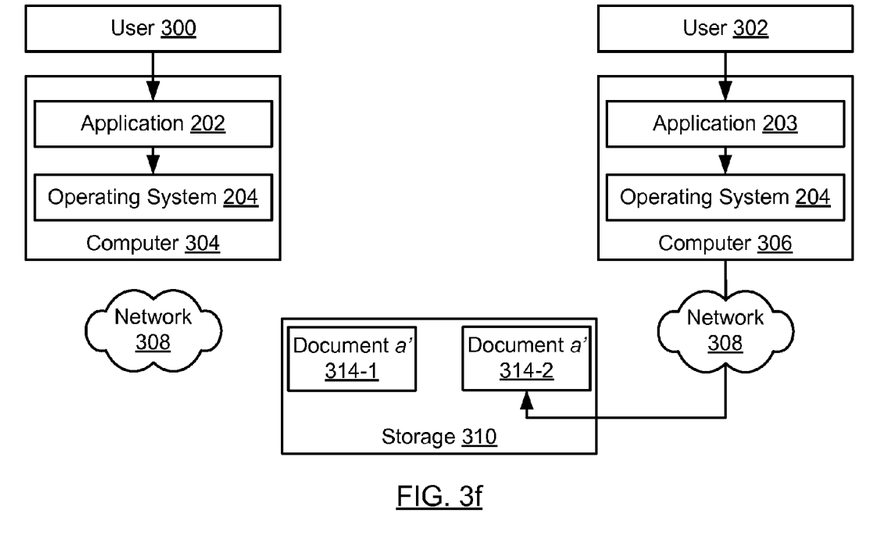

As such, FIG. 3f shows that modifications made to the document are preserved in storage (310) as files (314-1, 314-2) saved using both primary and secondary file formats. Further, because the storage (310) is available to a second user (302) over a network (308), the second user (310) has the benefit of access to the document as modified by way of the third file (314-2).

As discussed in relation to FIGS. 2a-2f, the system shown in FIGS. 3a-3f may allow for the saving of files in a common directory or in different directories. In a common-directory setup, the files (312-1, 312-2, 314-1, 314-2) shown in FIGS. 3a-3f may be saved to a single common directory for the storage device (310). In a first example of a multiple-directory setup, the files (312-1, 312-2, 314-1, 314-2) shown in FIGS. 3a-3f may be saved to either a first or a second directory for the storage device (310) based on which file format was used in saving the file. Accordingly, a first directory may be used to save all files associated with a primary file format (i.e., files 312-1, 314-1) and a second directory may be used to save all files associated with a secondary file format (i.e., files 312-2, 314-2). In a second example of a multiple-directory setup, the files (312-1, 312-2, 314-1, 314-2) shown in FIGS. 3a-3f may be saved to either a first directory for a first storage device or a second directory for a second storage device based on which file format was used in saving the file. As such, the first storage device may be an unshared storage disk local to the machine of the creator of the document and the second storage device may be a network-shared storage disk local to the machine used by the creator of the document or a cloud-based storage system.

Embodiments of the invention may provide a mechanism for notifying a second user (302) with a notification when a second file (314-2) for a document is saved to storage (310) using a secondary file format. For example, embodiments of the invention may require a second user (302) to register with a first user (300) for access to the document. Accordingly, registration may require the second user (302) to provide an e-mail address or other means of electronic communication such that, when a second file (314-2) is saved to storage using a secondary file format, a notification may be sent to the second user (302).

In addition, embodiments of the invention may allow for mechanisms to control the deletion of files. With respect to the first user (300), embodiments of the invention may display a prompt to the first user (300) when the first user (300) deletes a first file (314-1) for a document such that the prompt allows the first user (300) to decide whether to also delete a second file for the document. With respect to the second user (302), embodiments of the invention may allow the first user (300) to grant the second user (302) a deletion permission for the second file (314-2). As such, embodiments of the invention may require the second user (302) to register with a first user (300) to obtain a deletion permission for the second file (314-2) for a document.

Embodiments of the invention may allow for a creator of a document to save the document to storage as multiple files using multiple file formats. Further, because of the association created between a file saved using a primary file format and files saved using secondary file formats, embodiments of the invention perform a mechanism for automatically saving further modifications to the document using the primary file format as well as any associated secondary file formats. Accordingly, modifications made to the document after the time of the document's creation are archived to multiple file formats. Further, a document that is stored as a file using a secondary file format allows other users to access the document without depending on use of the primary file format.

Figure 4:
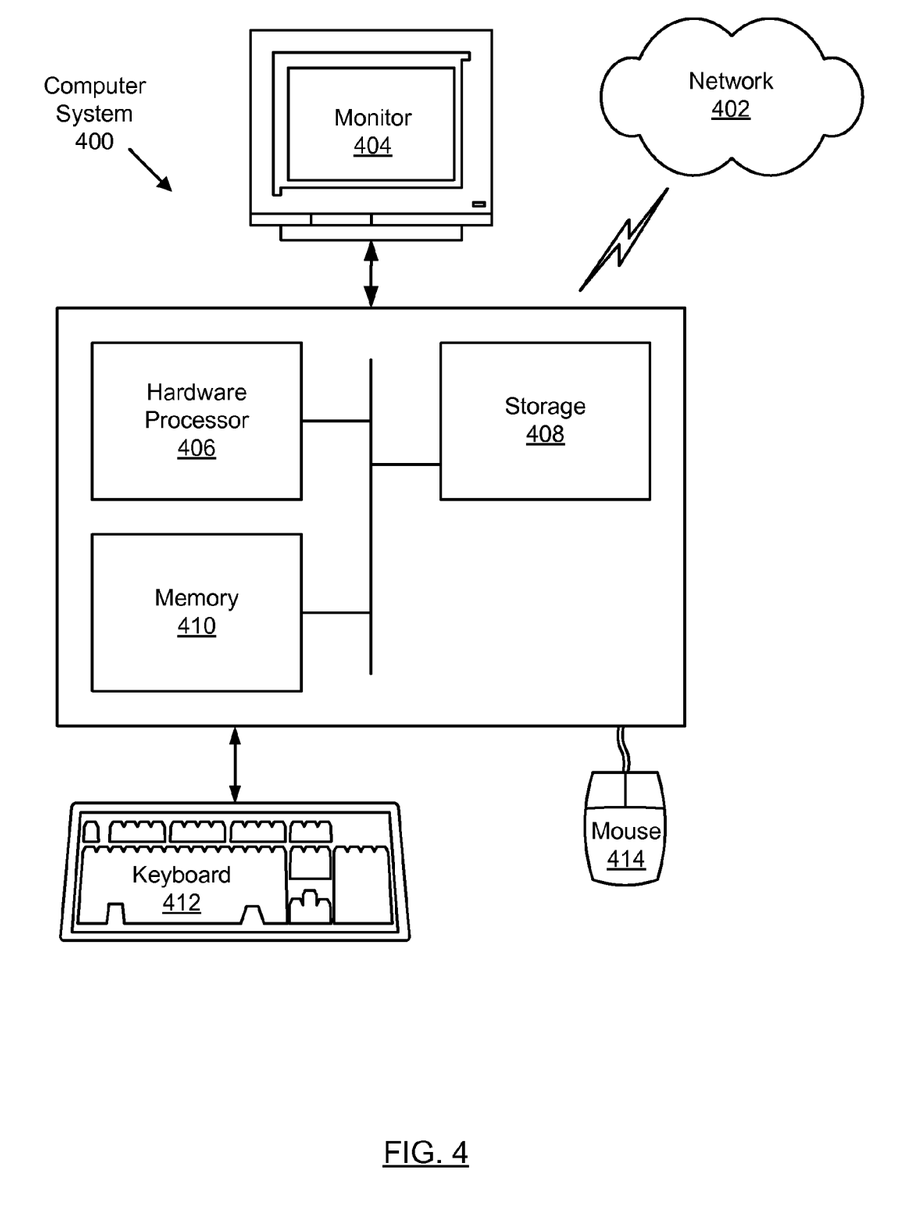
FIG. 4 shows a computer system in accordance with one or more embodiments of the invention.

FIG. 4 shows a computer system in accordance with one or more embodiments of the invention. Embodiments of the invention may be implemented on virtually any type of computer regardless of the platform being used. For example, as shown in FIG. 4, a computer system (400) includes one or more hardware processors (406), associated memory (410) (e.g., random access memory (RAM), cache memory, flash memory, etc.), a storage device (408) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (412), a mouse (414), or a microphone (not shown). Further, the computer (400) may include output means, such as a monitor (404) (e.g., a liquid crystal display (LCD), a plasma display, or cathode ray tube (CRT) monitor). The computer system (400) may be connected to a network (402) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a hardware processor with associated physical memory. The node may alternatively correspond to a hardware processor with shared memory and/or resources. Further, software instructions to perform embodiments of the invention may be stored on a computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for automatically saving a document in multiple file formats, comprising:
    receiving, from a user, a first request to save the document in a primary file format;
    saving, on a persistent storage device and in response to the first request, a first file for the document using the primary file format;
    creating, in response to the first request, a first data structure comprising a first file path for the first file;
    creating, in response to the first request, a second file for the document;
    saving, on the persistent storage device and in response to the first request, the second file for the document using a secondary file format;
    creating, in response to the first request, a second data structure comprising a second file path for the second file and a first mapping associating the first file with the second file;
    modifying, using an application executing on a hardware processor, the first file for the document;
    receiving a second request to re-save the first file as modified;
    re-saving, using the application and in response the second request, the first file as modified using the primary file format;
    when the first file is saved using the primary file format:
        determining the second file path using the second data structure;
        deleting, using the application and in response the second request, the second file from the second file path on the persistent storage device;
        deleting, using the application and in response the second request, the second data structure;
        creating, using the application and in response the second request, a third file for the document using the secondary file format;
        saving, using the application and in response the second request, the document as the third file on the persistent storage device using the secondary file format; and
        creating, using the application and in response the second request, a third data structure comprising a third file path for the third file and a second mapping associating the third file with the first file.

2. The method of claim 1, further comprising:
    when the document is saved as the first file using the primary file format:
        displaying, using the application interacting with a display device, a prompt; and
        receiving, using the application, an input in response to the prompt, wherein the input specifies the secondary file format.

3. The method of claim 1, wherein the primary file format is a proprietary file format for the application such that the user may only access the first file using the application.

4. The method of claim 3, wherein the secondary file format is a non-proprietary file format such that the second file and the third file may be accessed using a different application.

5. The method of claim 4, wherein the secondary file format is available to a creator of the first file when a fee is paid.

6. The method of claim 1, further comprising:
    sharing, using the application, the third file with the user over the network.

7. The method of claim 6, further comprising:
    when the third file is created using the application:
        sending, using the application, a notification to the user.

8. The method of claim 6, further comprising:
    when the third file is created using the application:
        granting, using the application, a deletion permission for the third file to the user.

9. The method of claim 6, further comprising:
    deleting, using the application, the first file; and
    when the first file is deleted using the application:
        displaying, using the application interacting with a display device, a prompt, wherein an input provided in response to the prompt determines whether the third file is deleted using the application.

10. A system, comprising:
    at least one hardware processor;
    a persistent storage device;

a display device interacting with the hardware processor; and a memory coupled to the at least one hardware processor and the display device, wherein the memory comprises executable instructions to:

receive, from a user, a first request to save a document in a primary file format;

save, on the persistent storage device and in response to the first request, a first file for the document using the primary file format;

create, in response to the first request, a first data structure comprising a first file path for the first file;

create, in response to the first request, a second file for the document;

save, on the persistent storage device and in response to the first request, the second file for the document using a secondary file format;

create, in response to the first request, a second data structure comprising a second file path for the second file and a first mapping associating the first file with the second file;

modify, using an application executing on the at least one hardware processor, the first file for a document;

receive a second request to re-save the first file as modified;

resave, using the application, the first file as modified using the primary file format;

when the first file is saved using the primary file format:
determine the second file path using the second data structure;
delete, using the application and in response the second request, the second file from the second file path on the persistent storage device;
delete, using the application and in response the second request, the second data structure;
create, using the application and in response the second request, a third file for the document using the secondary file format;
save, using the application and in response the second request, the document as the third file on the persistent storage device using the secondary file format; and
create, using the application and in response the second request, a third data structure comprising a third file path for the third file and a second mapping associating the third file with the first file.

11. The system of claim 10, further comprising:
a network interface card configured to operatively connect the system to the user over a network, and
wherein the memory further comprises executable instructions to:
share, using the application, the third file with the user over the network.

12. The system of claim 11, wherein the memory further comprises executable instructions to:
send, using the application, a notification to the user when the third file is created using the application.

13. The system of claim 11, wherein the memory further comprises executable instructions to:
grant, using the application, a deletion permission for the third file to the user when the third file is created using the application.

14. The system of claim 11, wherein the memory further comprises executable instructions to:
delete, using the application, the first file; and
when the first file is deleted using the application:
display, using the application interacting with the display device, a prompt, wherein an input provided in response to the prompt determines whether the third file is deleted using the application.

15. The system of claim 11, wherein the primary file format is a proprietary file format for the application such that the user may only access the first file using the application.

16. The system of claim 11, wherein the secondary file format is a non-proprietary file format such that the second file and the third file may be accessed by the user using a different application.

17. The system of claim 11, wherein the secondary file format is available to a creator of the first file when a fee is paid.

18. The system of claim 11, wherein the memory further comprises executable instructions to:
when the document is saved as the first file using the primary file format:
display, using the application interacting with the display device, a prompt; and
receive, using the application, an input in response to the prompt, wherein the input specifies the secondary file format.

19. A non-transitory computer readable storage medium comprising instructions for automatically saving a document in multiple file formats, the instructions comprising functionality for:

receiving, from a user, a first request to save the document in a primary file format;

saving, on a persistent storage device and in response to the first request, a first file for the document using the primary file format;

creating, in response to the first request, a first data structure comprising a first file path for the first file;

creating, in response to the first request, a second file for the document;

saving, on the persistent storage device and in response to the first request, the second file for the document using a secondary file format;

creating, in response to the first request, a second data structure comprising a second file path for the second file and a first mapping associating the first file with the second file;

modifying the first file for the document;

receiving a second request to re-save the first file as modified;

re-saving, in response the second request, the first file as modified using the primary file format;

when the first file is saved using the primary file format:
determining the second file path using the second data structure;
deleting, in response the second request, the second file using the second file path;
deleting, in response the second request, the second data structure;
creating, in response the second request, a third file for the document;
saving, in response the second request, the document as the third file using the secondary file format; and
creating, in response the second request, a third data structure comprising a third file path for the third file and a second mapping associating the third file with the first file.

20. The non-transitory computer readable storage medium of claim 19, wherein the instructions further comprise functionality for:
sharing the third file with the user over a network.

21. The non-transitory computer readable storage medium of claim 20, wherein the instructions further comprise functionality for:
sending a notification to the user when the third file is created.

22. The non-transitory computer readable storage medium of claim 20, wherein the instructions further comprise functionality for:
granting a deletion permission for the third file to the user when the third file is created.

23. The non-transitory computer readable storage medium of claim 20, wherein the instructions further comprise functionality for:
deleting the first file; and
when the first file is deleted:
displaying a prompt, wherein an input provided in response to the prompt determines whether the third file is deleted using the application.

24. The non-transitory computer readable storage medium of claim 20, wherein the primary file format is a proprietary file format for the application such that the user may only access the first file using the application.

25. The non-transitory computer readable storage medium of claim 20, wherein the secondary file format is a non-proprietary file format such that the second file and the third file may be accessed by the user using a different application.

26. The non-transitory computer readable storage medium of claim 20, wherein the secondary file format is available to a creator of the first file when a fee is paid.

27. The non-transitory computer readable storage medium of claim 20, wherein the instructions further comprise functionality for:
when the document is saved as the first file using the primary file format:
displaying a prompt; and
receiving an input in response to the prompt, wherein the input specifies a secondary file format.

* * * * *